United States Patent [19]
Bricheno et al.

[11] Patent Number: 5,574,811
[45] Date of Patent: Nov. 12, 1996

[54] METHOD AND APPARATUS FOR PROVIDING OPTICAL COUPLING BETWEEN OPTICAL COMPONENTS

[75] Inventors: Terry Bricheno, Great Sampford; James W. Parker, Herts, both of United Kingdom

[73] Assignee: Northern Telecom Limited, Montreal, Canada

[21] Appl. No.: 507,613

[22] Filed: Jul. 26, 1995

[30] Foreign Application Priority Data

Sep. 7, 1994 [GB] United Kingdom ............... 9417975

[51] Int. Cl.$^6$ ..................................... G02B 6/26
[52] U.S. Cl. ................... 385/52; 385/14; 385/49; 385/51; 385/88; 385/130
[58] Field of Search .................... 385/14, 15, 27, 385/31, 49, 50, 51, 52, 59, 65, 71, 80, 83, 88, 89, 129, 131, 132, 137, 130

[56] References Cited

U.S. PATENT DOCUMENTS

| 4,164,363 | 8/1979 | Hsu ........................ 385/49 X |
| 4,213,671 | 7/1980 | Lambert ................... 385/49 X |
| 5,029,971 | 7/1991 | Hunt et al. .............. 385/52 X |
| 5,230,030 | 7/1993 | Hartman .................. 385/31 X |
| 5,257,332 | 10/1993 | Pimpinella ............... 385/59 |
| 5,297,218 | 3/1994 | Hanaoka .................. 385/52 |
| 5,359,686 | 10/1994 | Galloway et al. ......... 385/49 |
| 5,379,359 | 1/1995 | Gupta ..................... 385/49 |
| 5,379,360 | 1/1995 | Ota et al. ............... 385/59 |
| 5,432,878 | 7/1995 | Smous .................... 385/52 |
| 5,475,775 | 12/1995 | Kragl et al. ............. 385/14 |
| 5,488,678 | 1/1996 | Taneya et al. ........... 385/14 |

FOREIGN PATENT DOCUMENTS

| 0077478 | 4/1983 | European Pat. Off. ............. 385/49 X |
| 0455240 | 11/1991 | European Pat. Off. ............. 385/49 X |
| 0504882 | 9/1992 | European Pat. Off. ............. 385/49 X |
| 0530875 | 3/1993 | European Pat. Off. ............. 385/49 X |
| 0532470 | 3/1993 | European Pat. Off. ............. 385/14 X |
| 0548440 | 6/1993 | European Pat. Off. ............. 385/88 X |
| 1524874 | 8/1978 | United Kingdom ................. 385/52 X |
| 1588346 | 4/1981 | United Kingdom ................. 385/49 X |
| 2146841 | 4/1985 | United Kingdom ................. 385/49 X |
| 2197089 | 5/1988 | United Kingdom ................. 385/52 X |
| 2219414 | 12/1989 | United Kingdom ................. 385/52 X |
| 2280544 | 2/1995 | United Kingdom ................. 385/49 X |
| WO89/01641 | 2/1989 | WIPO .............................. 385/49 X |

OTHER PUBLICATIONS

Jackson, "Optical Fiber Coupling Approaches for Multi-Channel Laser and Detector Arrays", SPIE Optoelectronic Materials, Devices, etc., vol. 994, pp. 40-47 (1988).

Primary Examiner—Brian Healy
Attorney, Agent, or Firm—Lee, Mann, Smith, McWilliams, Sweeney & Ohlson

[57] ABSTRACT

Optical coupling between the end of a laser (10) mounted on a silica motherboard (12) and an optical fibre (11) is effected with the aid of a silicon platform (14) to which the end of the fibre (11) is secured. The motherboard (12) and fibre platform (11) are crystallographically etched to provide complementary mating profiles with a clearance of less than 10 μm when alignment is established. While that alignment is maintained, resin (23) is introduced between motherboard and the fibre platform, and is cured. The minimal thickness of the cured resin minimises misalignments caused by resin shrinkage.

14 Claims, 7 Drawing Sheets

METHOD AND APPARATUS FOR PROVIDING OPTICAL COUPLING BETWEEN OPTICAL COMPONENTS

BACKGROUND OF THE INVENTION

This invention relates to the provision of optical coupling between optical components, and in particular to the provision of optical coupling between one or more optical components, at least one of which is an optical waveguide, and one or more other optical components that may for instance be constituted by electro-optic transducers or passive optical components such as micro lenses or other waveguides.

The precision of alignment that is required between the end of an optical waveguide, and that of some other optical component with which that waveguide is required to be optically coupled, depends upon the particular application involved. Thus relatively little precision is required in aligning an optical fibre with a slow-speed large-area photodiode, whereas somewhat greater precision is generally required for aligning a multimode fibre with a light emissive diode, and still greater precision is typically required for aligning a single mode fibre with an injection laser. Alignment between components may be achieved using either a dead-reckoning approach or a monitored approach.

In the case of a dead-reckoning alignment approach, the components to be aligned are placed in intimate contact with some alignment substrate whose shape is such that the mere placing of the components in such intimate contact automatically serves to locate them with the necessary precision relative to each other. All that is then necessary is to retain the components in position on the alignment substrate, and this can often conveniently be accomplished by the application of some fixative medium to lock the components in place. This form of dead-reckoning alignment, using photolithographically etched single crystal silicon alignment substrates, has for instance been demonstrated to provide adequate precision for aligning multimode fibres with injection lasers as described by K P Jackson et al in a paper entitled, 'Optical Fiber Coupling Approaches for Multichannel Arrays', SPIE Vol. 994, Optoelectronic Materials, Devices, Packaging And Interconnects II (1988) pages 40–47. The authors of the paper state that their photolithographic processing enables them to position the end of a 50/125 µm graded-index multimode fibre relative a laser with a positional accuracy of ±31 µm. In the corresponding case of positioning the lensed end of a standard single mode fibre relative an injection laser designed for direct modulation it is typically desirable to keep the coupling efficiency to within 1 dB of its maximum value and this typically requires a precision of about ±0.7 µm in directions at right angles to the fibre axis. The precision requirements are even greater for coupling a wedge-ended single mode fibre with the more highly astigmatic emission from a 980 µm wavelength pump laser, for which the equivalent precision requirement is about ±0.41 µm.

In order to satisfy these more stringent precision requirements, recourse is typically had to some form of monitoring in which the laser is energised, and the coupling efficiency actually achieved is monitored, with the aid of a photodetector, while the alignment between laser and fibre is adjusted so as find the alignment position providing optimum coupling efficiency. Once that alignment position has been found, the alignment should be held steady while a bonding agent is applied to provide permanent fixing. This type of alignment procedure that involves monitoring will hereafter be referred to as active alignment, whereas the dead-reckoning alignment procedure to which previous reference has been made will be referred to as passive alignment.

A significant problem which is often encountered with active alignment is the tendency of the bonding agent to disturb the alignment as it effects the bond. Thus if a resin bonding agent, such as an epoxy resin, is used, it is found that the shrinkage which occurs on curing of the resin is very liable to disturb the alignment. A similar effect is also encountered when using solder or brazing metal as the bonding agent, or when using welding such as laser beam welding to effect the bond. In each case of soldering brazing or welding, shrinkage occurs during the freezing of the molten metal. Such misalignment due to shrinkage of bonding materials is for instance mentioned in GB-A-2 146 841. The coupling arrangement may be such as to allow for this type of misalignment to be compensated by subsequent plastic deformation of the supporting structure for the fibre, but this approach to the solving of the problem is liable to introduce longer term instability problems associated with the relaxation of residual stresses introduced into the structure during the plastic deformation procedure. Such relaxation may be induced by thermal cycling of the coupling. Thermal cycling can also induce phase separation in solders, particularly high lead content solders, that can induce relaxational type movement.

SUMMARY OF THE INVENTION

The present invention is directed to active alignment procedures that use some of the techniques also employed in passive alignment procedures in order to minimise the shrinkage-based misalignment effects of prior art active alignment procedures.

According to the present invention there is provided a method of mounting first and second optical components in optically coupled relationship, wherein the first optical component comprises an optical waveguide formed in or mounted on a first substrate and the second optical component is formed in or mounted on a second substrate, wherein the first and second substrates are provided with at least one pair of substantially complementary profile mating surfaces, and wherein the first and second optical components are positioned with respect to their respective substrates with a precision that ensures that a maximum value of optical coupling between said components occurs with a relative positioning of each of said mating surfaces with respect to its pair providing a non-zero spacing therebetween of not substantially more than 10 µm, in which method said relative positioning is substantially established and is held while a bonding medium between each of said mating surfaces and its pair is solidified.

It is important to draw a distinction between the alignment method of the present invention and the techniques of fully passive alignment. In a true passive alignment scheme, the parts to be aligned are placed in intimate contact with some form of alignment member with no possibility of further movement, and some fixative medium is applied to lock the components in place. The possible misalignment resulting from such a procedure is the summed geometrical errors of all the component parts. For example, in the passive alignment of an optical fibre with a substrate mounted injection laser chip, these errors would include fibre diameter, fibre concentricity, laser active layer spacing within the chip, laser strip location with respect to a chip edge as well as fabrication errors within the alignment substrate.

With the active alignment method of the present invention the tolerances placed on the components are only such as to produce an aggregate error of not more than 10 μm. This can be relatively readily achieved with a significant relaxation of tolerances put upon individual parameters such as fibre geometry, substrate preparation, laser chip metallisation and placement. Such relaxation has, in its turn, significant implication with respect to yield improvement. The only penalty which has to be paid for this relaxation is the need for perform the active alignment step itself. Typically this would involve the need to power the laser prior to the securing of the fibre, though even this requirement may be avoidable using some other form of external registration assessment, for instance using registration cues incorporated into the laser chip and its supporting substrate.

One preferred form of bonding medium is a resin adhesive, such as an epoxy resin. This may be introduced by capillary action between the mating surfaces of the two substrates once they have been brought into position to provide the required alignment between their respective optical components. For capillary action to be effective within a reasonable timescale, the uncured resin needs to be applied in a relatively mobile liquid form. Viscosity of the uncured resin may be capable of being reduced by applying it hot. It is not necessary for the resin to be applied after alignment; it can be applied beforehand, provided that it then remains mobile long enough for alignment to be subsequently established.

An alternative form of bonding medium is a solder. This may similarly be introduced by capillary action between mating surfaces when the two substrates have been brought into position to provide the required alignment between their respective optical components. The two substrates do not need to be made entirely of solder-wettable material provided that their mating surfaces have facings that are solder wettable. An alternative way of providing the solder is as a solder layer depicted upon the mating surfaces of either or both substrates. Such solder would then require to be reflowed to permit the required relative alignment of the optical components respectively secured to the two substrates.

Preferably the mating surfaces are configured to provide an interlocking arrangement having the property that the establishment contact, either direct or bonding medium mediated, between the mating surfaces causes the two substrates to assume a relative orientational alignment of their respective two optical components that is substantially optimised. Under these circumstances the subsequent achieving of the desired relative positioning the two optical components will require translational adjustments in three orthogonal axial directions without any need for roll, pitch or yaw type angular movement adjustment. Such interlocking contact may be of the fully interlocking kind that permits no further movement, as for instance provided by a set of bosses and wells of complementary shape; or it may be of the partial kind that allows sliding movement in one direction, as for instance provided by a set of parallel rails and grooves of complementary shape. In the latter instance the direction of permitted movement is typically preferably aligned with the axial direction of the second optical component of the optical waveguide because coupling efficiency is usually less sensitive to relative movement in this axial direction than to relative movements at right-angles to it. The establishment of the interlocking contact, partial or full, provides coarse alignment of the two optical components respectively in two or three dimensions to within ±10 μm, thereby setting limits to the amount of scanning range required to find the desired optimal alignment and thus facilitating the effecting of this scan by automatic means in the performance of an active fine-adjustment procedure.

The adjustment required to produce the relative positioning of the two substrates affording the maximum value of coupling coefficient between the first and second optical components may conveniently be performed using a jig having first and second parts to which the substrates are respectively temporarily secured, and in which the temporary securing of at least one of the substrates to its associated jig is by way of a soldered connection. This soldered connection is rendered fluid while the mating surfaces of the two substrates are brought into contact, and then is solidified before contact is released. In this way the two substrates are first enabled to assume a relative orientation that provides contact between the mating surfaces, and that thus ensure the required optimised relative orientational alignment of the two optical components, and then maintains this relative orientational alignment while translational movements are employed to optimise the optical coupling between them.

Application of the method of the present invention requires the availability of a technology capable of providing pieceparts in suitable materials having a precision of ±5 μm or better. Conventional metal machining and diestamping can be used to produce relatively cheap mass-produced pieceparts, but tolerances tend to be limited by tool wear. Photolithographic etching of metal pieceparts suffers from tolerances being limited by the polycrystalline nature of metals. Relatively tight tolerances can be achieved by electro-deposition of metallic structures into photolithographically defined 'moulds', a technique that is well established in the watchmaking industry. A form of processing that affords the possibility of meeting the tolerance requirements is provided by the production of cast and sintered molybdenum parts. The high thermal conductivity and low thermal expansion coefficient of molybdenum make it particularly attractive for use as a laser submount material. However, perhaps the most well-developed technology for the mass production of precision pieceparts is etched single crystal silicon. Etched silicon technology is fully capable of delivery fibre arrays with sufficiently accurate lateral spacing to allow the pigtailing of laser arrays without placing unrealistic specifications on fibre geometry. The combination of lateral precision with the robustness of a single crystal silicon substrate allows the precise application of relatively large forces during fixing, which translate into greater stiffness of the jigged assembly, and hence further control of unwanted movements. Additionally, in combination with single crystal silicon-based optohybrid motherboards, the complete interface, apart from the boundary layer(s), would be formed in a single material, offering the prospects of high stability and thermal trading performance.

BRIEF DESCRIPTION OF THE DRAWINGS

There follows a description of the manufacture of optical assemblies in which at least one optical component in the form of an optical fibre is optically coupled with at least one other component by methods embodying the invention in preferred forms. The description refers to the accompanying drawings in which.

DETAILED DESCRIPTION OF PREFERRED EMBODIMENTS

Figure 1:
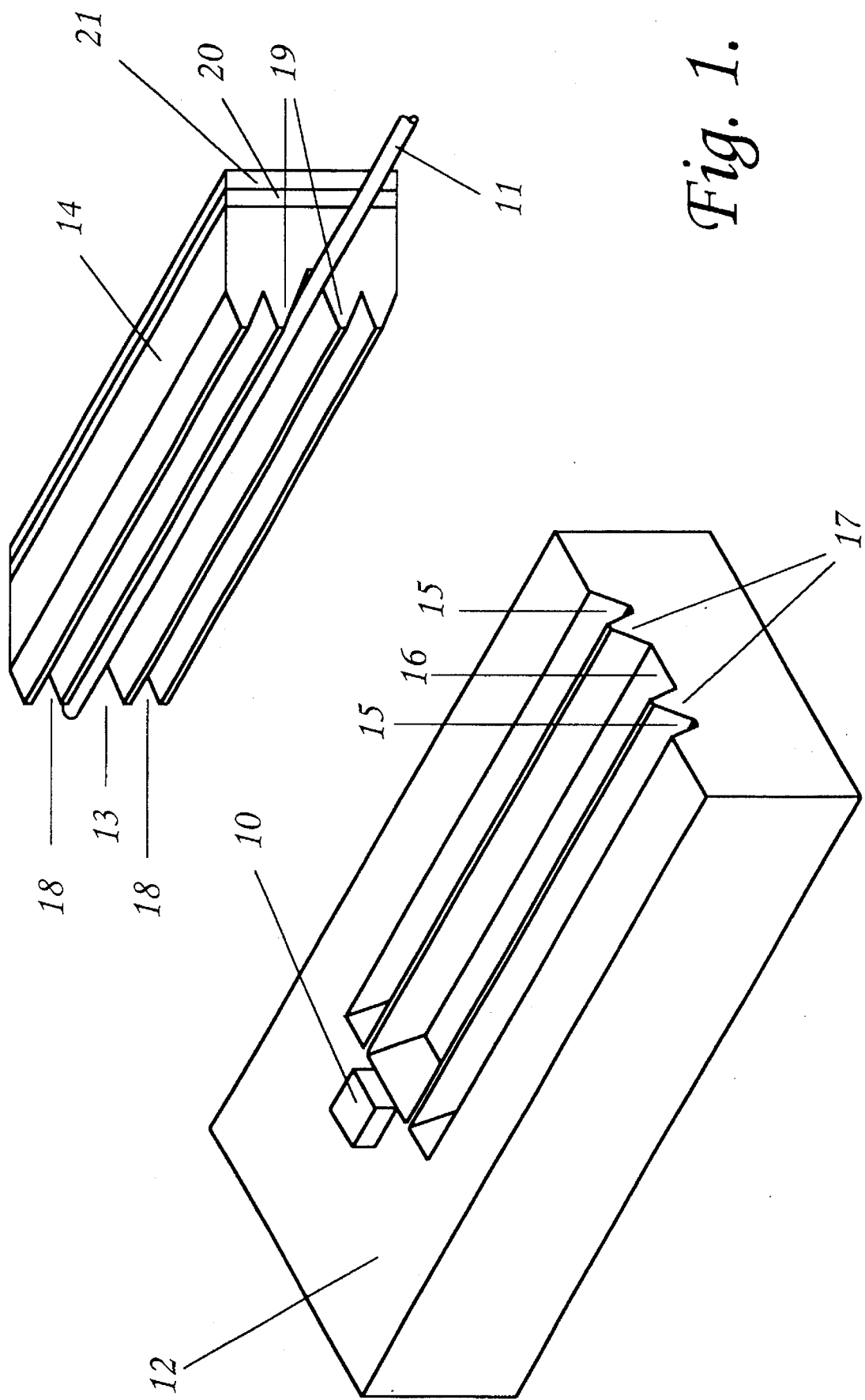
FIG. 1 depicts a perspective view of a two-part laser to optical fibre coupling prior to assembly of the two parts.
Figure 2:
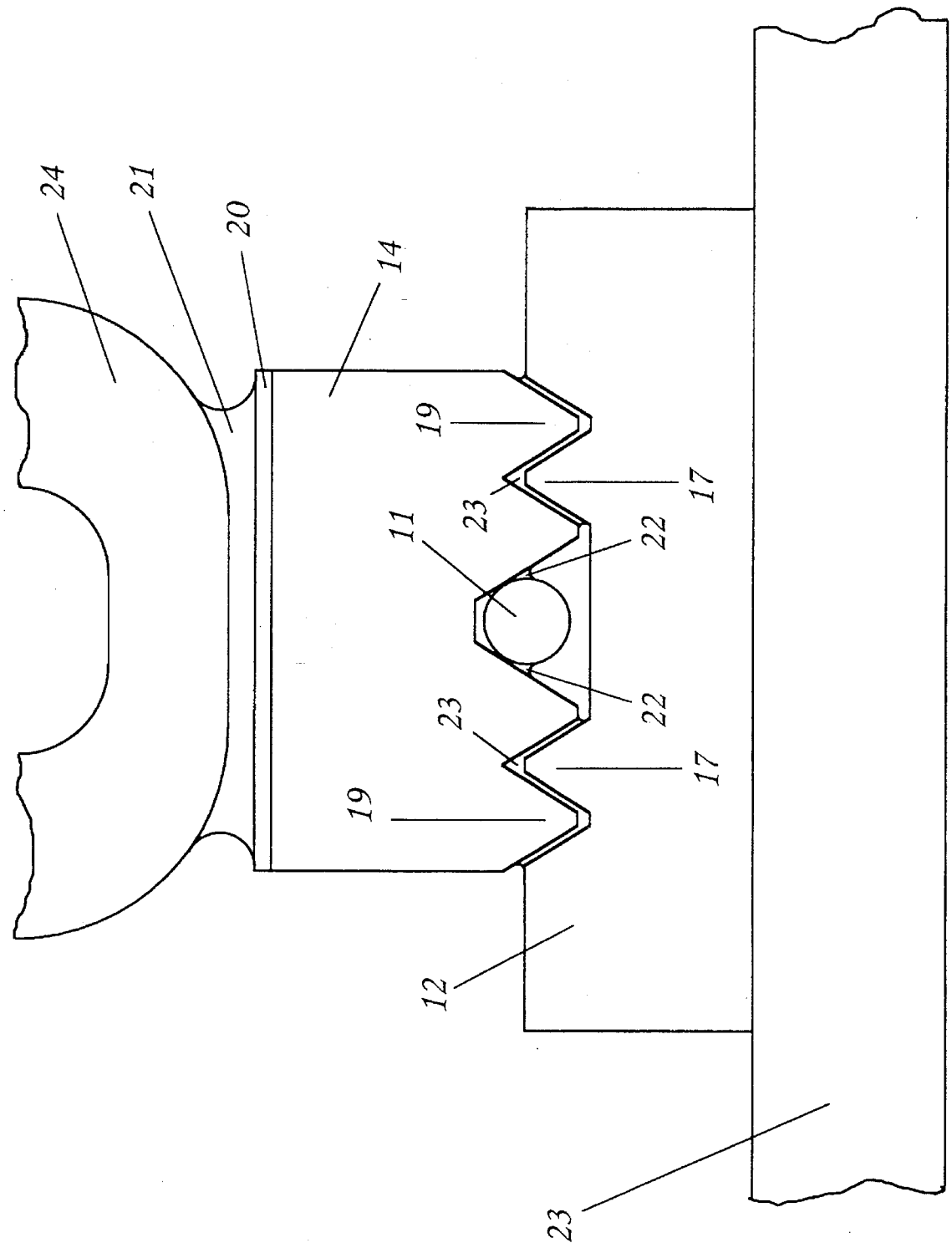
FIG. 2 depicts a view of the coupling of FIG. 1 during assembly of the two parts.

FIGS. 1 and 2 depict components employed in the effecting of optical coupling between an injection laser diode 10, for instance a DFB laser, and the lensed end of an optical fibre 11. The laser 10 is bonded down on to a single crystal silicon motherboard 12, and the optical fibre 11 is bonded down into a photolithographically defined and crystallographically etched Vee-groove 13 in a single crystal silicon platform 14 which is later bonded down on to the motherboard 12. Typically the platform 14 may be about 0.75 mm wide and between 2 and 5 mm in length. Designating the axial direction of the fibre 11 in the completed assembly as the z-direction, the direction normal to the plane of the motherboard as the y-direction, and the third Cartesian direction as the x-direction, the precision of positioning of the laser diode 10 relative to the lensed end of the fibre 11 is much less critical in the z-direction than it is in the x- and y-directions. For this reason it is acceptable in this instance to provide the motherboard 12 and fibre platform 14 with non-planar mating surfaces in the form of rails and grooves of complementary profile that extend in the y-direction, and so do not of themselves provide positioning constraint in the z-direction. Were such constraint required in any particular instance, the rails and grooves could be interrupted at intervals along their length in such a way as to convert them into rectangular- or square-based pyramids and wells of complementary profile (not illustrated), the pyramids preferably being flat-topped pyramids.

In the motherboard 12 there is photolithographically defined and crystallographically etched a set of three grooves comprising a pair of grooves 15 between which is located a central groove 16 so that a pair of rails 17 is formed between the grooves 15 and the groove 16. Similarly, in the fibre platform 14, the photolithographic definition and crystallographic etching employed to form the groove 13 is at the same time employed to define and etch further grooves 18 that define a pair of rails 19.

The position of the laser emission axis of the laser diode 10 relative to the grooves 16 and rails 17 typically needs to be determined with a precision better than +5 μm in the x- and y-directions. Normal semiconductor device processing is readily able to ensure that the distance between the active layer and the semiconductor surface facing the motherboard is determined with a precision of less than ±1 μm. Control over the amount of solder employed to bond the laser to the motherboard can be employed to provide a close tolerance upon the thickness of the solder layer after bonding. Similar close control is readily obtained in respect of any dielectric or electrically conductive layers that may be provided between the silicon of the motherboard and the underside of the solder, and so a precision better than ±5 μm in the y-direction is relatively readily achieved. A similar precision in the x-direction is attainable using solder bump technology in which the laser diode is bonded to a solder wettable pad (not shown) whose position had been photolithographically delineated using masking that also delineates the positioning of the grooves 15 and 16.

By way of a particular example, a silicon motherboard extending in the {100} plane was provided with a passivation layer (not shown) of silicon nitride before the deposition of an electrically conductive titanium/gold/titanium interconnect layer (not shown) photolithographically patterned using a lift-off process. The interconnect layer was covered with a second dielectric layer (not shown) of silica on silicon nitride deposited by plasma enhanced chemical vapour deposition. Next photolithographic process was used to etch vias to expose selected areas of the interconnect. Reactive ion etching (RIE) was used to etch the dielectric, followed by a wet etch to etch through the upper titanium layer in the vias to expose the underlying gold. Further photolithographic processing was then employed to form a patterned layer of solder-wettable material comprising for instance a three-layer sandwich of titanium/platinum/gold. The patterning provided in this layer included a pad to which the laser 10 is later bonded, and also masking stripes for etching the grooves 15 and 16. Later RIE was employed to etch first the portions of the second dielectric layer exposed between the groove-defining stripes of solder-wettable material, and then the underlying first dielectric layer so as to expose the underlying silicon. Before proceeding to the etching of the exposed silicon, another photolithographic processing stage was employed to deposit a gold/tin solder for the bonding of any other discrete electrical components that are required to be bonded to the motherboard. Then, once all the necessary photolithographic processing of the motherboard had been completed, a wet etch, for instance comprising ethylene diamine pyrocatecol (EDP) and piperizine, was employed to etch the exposed silicon to {111} plane thereby forming the Vee-grooves 15 and 16. (Further details of this processing are to be found in British Patent Application 2 280 544A to which attention may be directed).

The same etchant is used for the crystallographic etching of the grooves 13 and 18 in the silicon platform 14, but a much less complicated photolithographic processing sequence is involved since all that is required is the preparation of an etch mask without the attendant problems of providing any interconnect layer, vias, or solder wettable areas for the attachment of discrete components. On the other hand, the surface of the platform 14 opposite the surface with the grooves 13 and 18 may be provided, for positional manipulation purposes, with an unpatterned layer 20 of solderwettable metal that is itself covered with an unpatterned layer 21 of solder.

With the platform 14 with its grooved surface face-up, the fibre 11 is laid in the groove 13 with its lensed end projecting a short distance beyond one end and, while it is biased into contact with the walls of the groove, a small quantity of epoxy resin is applied as a drop on the end of a fine glass whisker (not shown) to form fillets 22 (FIG. 2) securing the fibre in position in the groove 13.

The motherboard 12 is bonded down to a member 23, which in its turn is secured within a housing (not shown), and the housing is gripped between the jaws of a clamp (not shown) on a heated mounting stage (not shown) provided with orthogonal translational movement stages (not shown) in the plane of the motherboard 12. The fibre 11 is placed in approximate position relative the laser chip 10, and then a weld-pulse soldering tip 24, mounted on a translational movement stage (not shown) operating orthogonally with respect of the other two movement stages, is lowered on to the soldered side of the fibre platform 14, and is used to push the rails 19 of that platform fully home into the complementary grooves 16 formed in the motherboard. At this stage a controlled current pulse is fed through the soldering tip 24 sufficient briefly to flow the solder layer 21. This serves to bond the fibre platform 14 to the soldering tip 24 so that the three translational movement stages can be operated to adjust the relative positioning of the fibre platform and motherboard to find a position of optimum optical coupling between the laser 10 and the lensed end of the fibre 11 without disturbing the orientation alignment of these two components. This optimum position is found by scanning the movement stages while the laser chip 10 is powered and the proportion of its emission that is launched into the fibre 11 is monitored with a photodetector (not shown) optically coupled with the distal end of that fibre. When this position has been found, it is maintained while a mobile drop of heated epoxy resin from the end of a fine glass whisker (not shown) is applied to each of the grooves 16 adjacent the ends of the rails 19 remote from the laser chip 10. This resin flows by capillary action into the narrow gap of less than 10μm that exists between the grooves 16 and rails 19 to form a pair of resin fillets 25. After this resin has been cured, a second pulse is applied to the solder tip 24 to release it from the fibre platform, thus completing the alignment and bonding procedure.

In the above described alignment and bonding procedure the motherboard is held in fixed angular orientation with respect to the soldering tip, and then the fibre platform is urged into contact with the motherboard by the soldering tip before the platform has been soldered to the tip. Accordingly, at this stage the fibre platform is free to assume the correct angular orientation with respect to the motherboard by being urged into contact therewith. The first pulsing of the soldering tip serves temporarily to retain this angular orientation of the fibre platform with respect to the soldering tip. Translational adjustments are then made to secure the required full alignment (angular and translational) between motherboard and fibre platform before these two components are secured together with resin, and then the second pulsing of the soldered tip serves to release it from the assembly.

An alternative approach to the obtaining of the required relative angular orientation between motherboard and the fibre platform prior to the making of the translational adjustments is to mount, in a releasable fashion, the motherboard or the platform in an air-bearing that allows it to pivot freely while the platform or motherboard is urged into contact with the air-bearing mounted component, and then to turn off the air supply to cause the orientation of that component to be held while translational adjustments are made.

Figure 3:
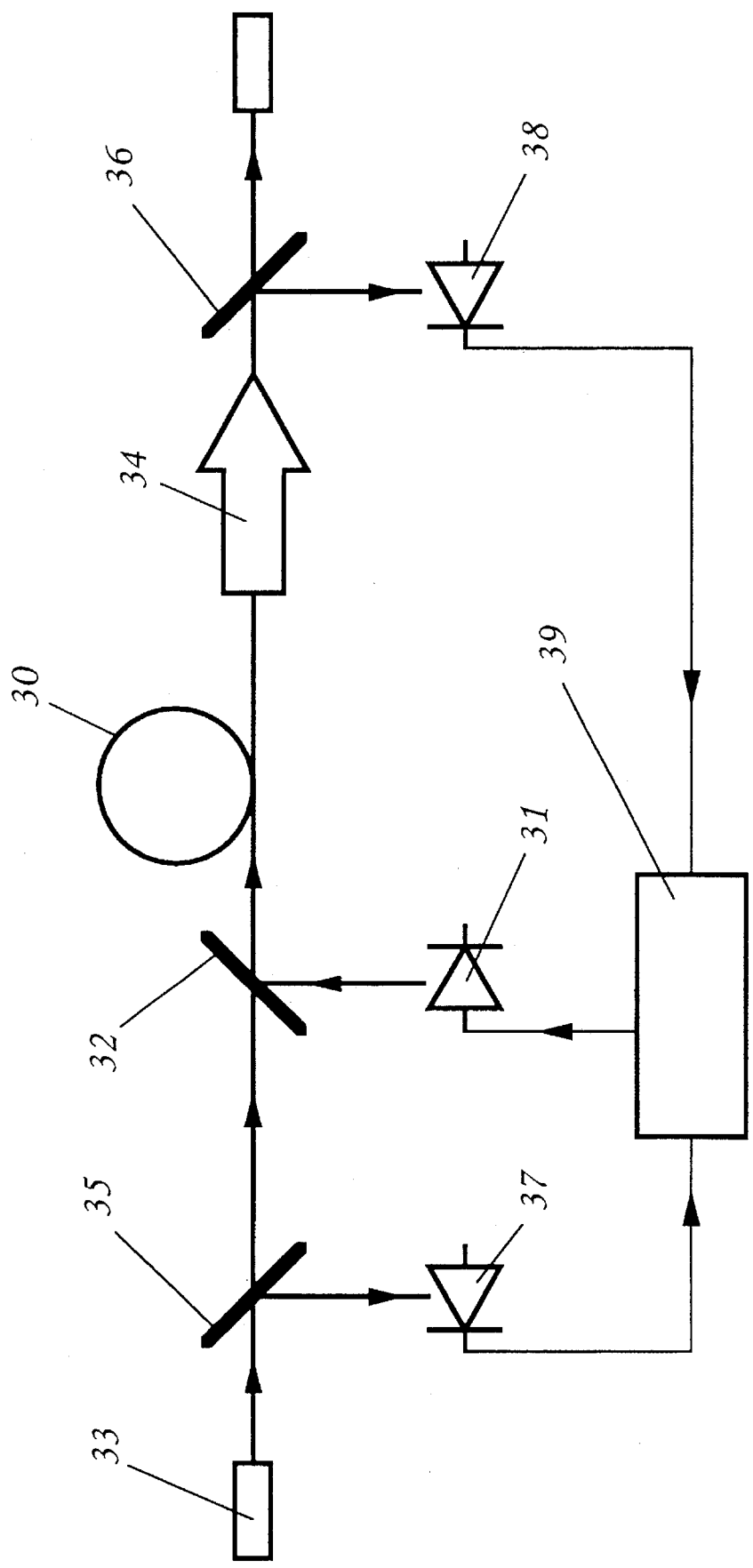
FIG. 3 is a diagram of the components of an amplifier.
Figure 4:
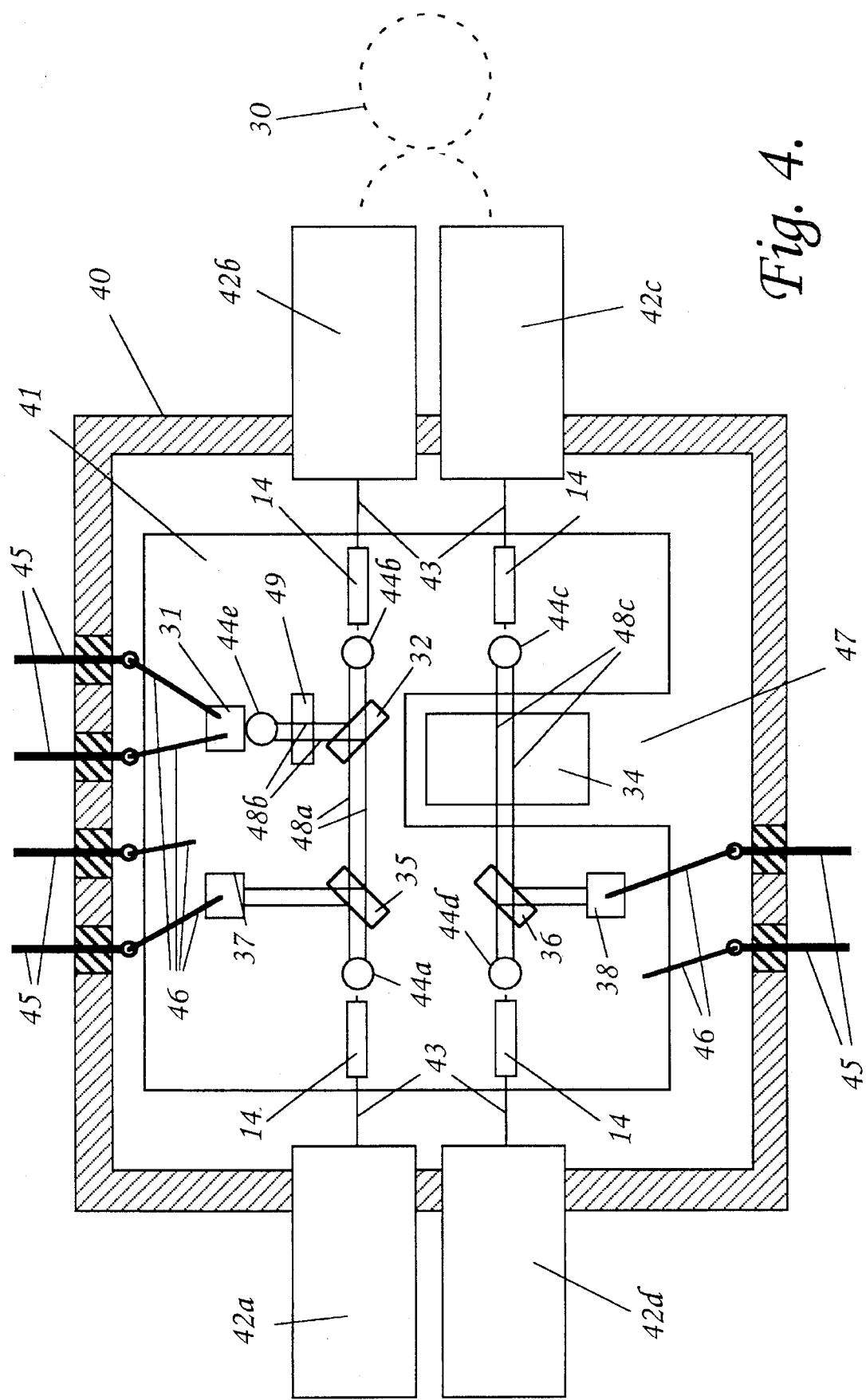
FIG. 4 is a schematic representation of components of the amplifier of FIG. 3 assembled upon a substrate in a housing.

The specific embodiment described above with particular reference to FIGS. 1 and 2 has concerned establishing substantially optimal optical coupling between an injection laser and the lensed end of an optical fibre. Attention will now be directed to an alternative embodiment in which the method of the invention is employed to align the end of fibres with beam-expanding ball lenses in a fibre amplifier. FIG. 3 represents, in diagrammatic form, the interconnection of the basic components of this amplifier. These comprise a length 30 of optically amplifying fibre; an optical source 31 acting as an optical pump for the amplifying fibre; an optical multiplexer 32 for combining the optical pump power from the pump source with an input signal applied to the amplifier at input port 33; an optical isolator 34; two taps 35, 36 for tapping off a small proportion of the signal power respectively before and after amplification; a pair of monitor photodiodes 37, 38 positioned for receiving the tapped power; and a form of feedback control system 39 that employs the outputs of the two monitor photodiodes 37, 38 for regulating the power output of the pump source 31, and hence the gain provided by the amplifier. Referring now to FIG. 4, all those components of the amplifier, with the exception of the amplifying fibre 30 and the feedback control system 39, are mounted in a housing 40 and, with the exception of the input terminal 33 isolator 34, all of these are mounted on a single crystal silicon motherboard 41 mounted within the housing 40. Through the housing wall are mounted four optical fibre hermetic feed-throughs 42a to 42d each of which is threaded by an associated a fibre pigtail 43, one end of which is secured to an associated silicon fibre platform 14 positioned in close proximity to an associated spherical microlens 44A to 44d. Also threading the wall of the housing 40 are electrical feed-through electrical terminals 45 to which internal electrical connection is made by way of flying leads 46. The isolator 34 is secured to the base of the housing 40 accommodated within a slot 47 formed in the motherboard.

Light launched into the housing 40 by way of the fibre pigtail 43 threading feed-through 42a, which constitutes the input terminal (33 of FIG. 3) of the amplifier, is formed into a collimated expanded beam 48a by ball lens 44a. A small part of the light in this expanded beam 48a is reflected by a parallel-sided transparent plate, which constitutes the input signal power tap 35, and is directed on to the photosensitive surface of monitor photodiode 37. The remainder of the light is transmitted through a second parallel-sided transparent plate, which is provided on one major surface with a dichroic filter, and to constitute the optical multiplexer 22 that operates by being highly reflective to light at the pump wavelength incident upon it from the pump laser 31 while being substantially transparent to light at the signal wavelength incident upon it from ball lens 44a. The output of the pump laser 31 is formed into a collimated expanded beam 48b is superimposed on expanded beam 48a. These two expanded beams are then focused by ball lens 44b on to the inboard end of the fibre pigtail 43 that threads feed-through 42b. One end of the optically amplifying fibre 30 is optically coupled with the fibre pigtail threading feed-through 42b, while the other end is similarly optically coupled with the fibre pigtail threading feedthrough 42c. The amplified input signal is then directed from the fibre pigtail threading feed-through 42c into ball lens 44c to produce a collimated expanded beam 48c. This is transmitted through the isolator 34, after which a small proportion is reflected by a third parallel-sided transparent plate which constitutes the output signal power tap 36 and is directed on to the photosensitive surface of monitor photodiode 38. The remainder of the light of expanded beam 48c is transmitted through the output signal power tap 36 to be incident upon ball lens 44d which focuses the light on to the inboard end of the fibre pigtail 43 that threads feed-through 42d, the output of the amplifier.

Figure 5:
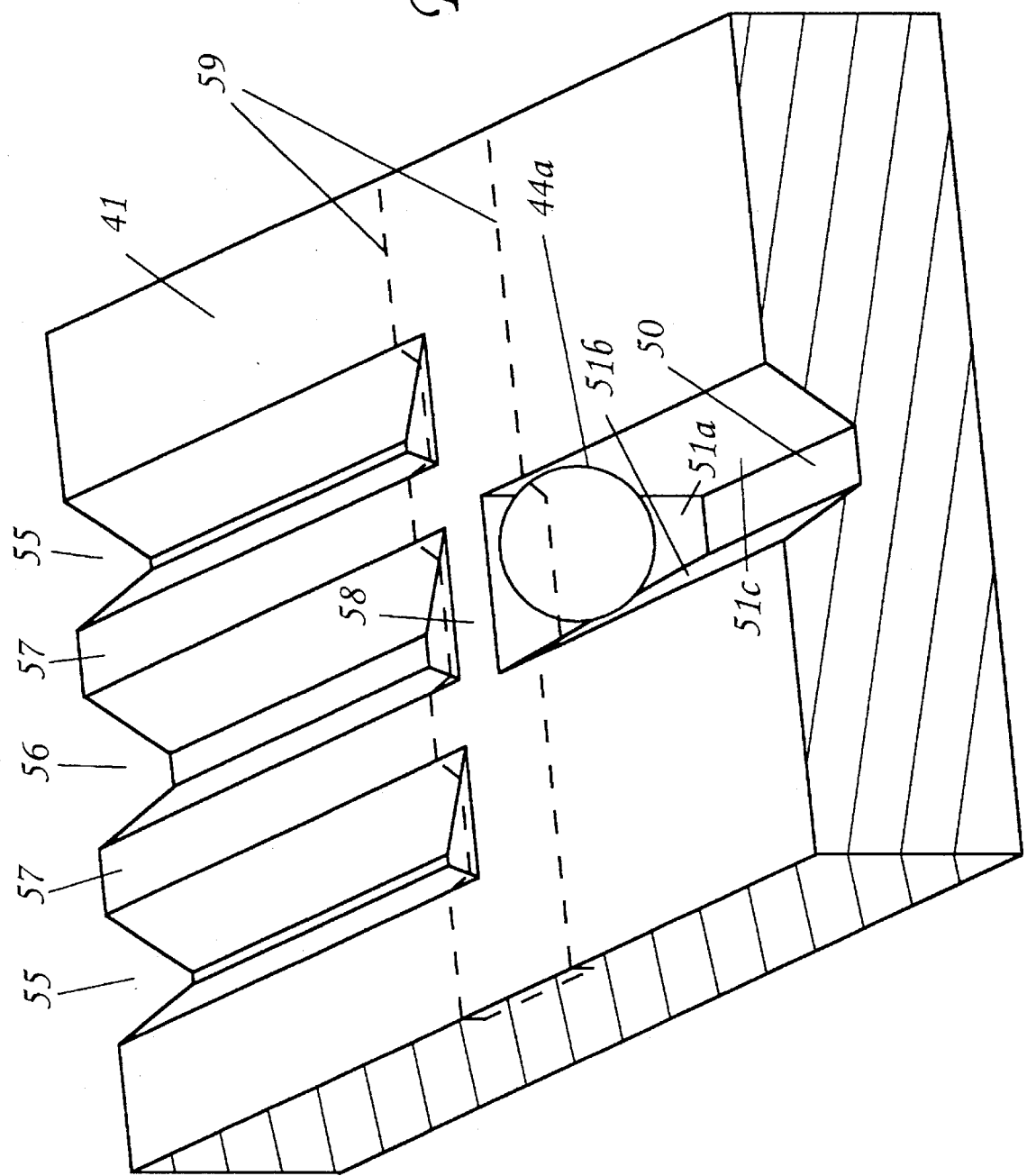
FIG. 5 is a sectioned perspective view of a portion of the substrate of FIG. 4.

The four fibre platforms 14 employed in this amplifier may be substantially identical to the platform 14 of the laser-to-fibre coupling described above with particular reference to FIGS. 1 and 2. The complementary profile that is formed in the motherboard 41 is shown in FIG. 5 which depicts a sectioned perspective rise of a portion of the motherboard 41 in the vicinity of its ball lenses 44a. The major surface of the motherboard 41 extends in a {100} plane in which a number of grooves with {111} plane facets are crystallographically etched. For accommodating a fibre platform 14, there is a pair of grooves 55 between which is located a central groove 56 so that a pair of rails 57 is formed between the grooves 55 and the grooves 56. The grooves 55 and 56 and the rails 57 correspond in shape generally with their counterpart grooves 15 and 16 and rails 17 found in the motherboard 12 of FIG. 1. In alignment with the groove 56, but slightly spaced therefrom by a strip 58, is a groove 50 with crystallographically etched {111} plane faces 51a, 51b and 51c against which the ball lens 44a rests and is secured with resin (not shown). Generally, but not necessarily, the grooves 50 and 56 are of different width. Prior to the securing of the ball lens in position in groove 50 and in order that the optical coupling between the ball lens and the fibre pigtail with which it is associated shall not be unduly obstructed, the strip 58 is partially cut away by means of a saw-cut, indicated by broken lines 59, perpendicular to the axis of the fibre pigtail. Care is taken to ensure that the depth of cut is not so great as to impact upon that portion of face 51a with which the ball lens is to come into contact.

A preferred sequence for aligning the components on the motherboard 41 commences with the energisation of the pump laser and the adjustment of the orientation of the beam adjusting prism 49 until the beam emerges from that prism in the plane defined by the centres of the four ball lenses 44a, 44b, 44c and 44d. Next a light source is employed to launch light into the housing via the amplifying fibre input, the fibre pigtail threading feed-through 42b, and its associated fibre platform 14 is adjusted until this light emerges from ball lens 44b as a collimated beam directed at ball lens 44a. This fibre platform is then permanently secured in position. Next, the pump laser 31 is re-energised and the orientation of the dichroic multiplexer plate 32 is adjusted to maximise the light output from the fibre pigtail threading feed-through 42b. The multiplexer plate is then permanently fixed in this position. Next the fibre platform 14 associated with the fibre pigtail threading feedthrough 42a is temporarily fixed in position, and light is launched into it while the position of the input monitor tap plate 35 is adjusted to maximise the electrical signal developed by monitor diode 37. Under these conditions the monitor tap plate 35 is permanently fixed in position on the motherboard, and then final adjustments are made to maximise the optical coupling between the fibre pigtails respectively threading feed-throughs 42a and 42b before permanently fixing in position the fibre platform 14 associated with the fibre pigtail threading feed-through 42a. A similar procedure is then used in respect of the fixing in position of the output tap plate 36 and the fibre platforms 14 associated respectively with the fibre pigtails threading feed-throughs 42c and 42d. First, before the isolator 34 is in position, light is launched into the fibre pigtail threading feed-through 42a, and the fibre platform 14 associated with this fibre pigtail is permanently fixed in position on the motherboard after it has been adjusted to provide a collimated beam directed towards ball lens 44d and lying in the plane of the four ball lenses 44a, 44b 44c and 44d. Next output monitor tap plate 36 is permanently fixed once its position has been adjusted to maximise the electrical signal it develops in response to the light launched into fibre pigtail threading feed-through 42c. Then the isolator 34 is fixed in position, and finally the fibre platform 14 associated with fibre pigtail threading feed-through 42d is permanently fixed in position on the motherboard after it has been adjusted to optimise the optical coupling provided between fibre pigtails threading feed-throughs 42c and 42d.

Typically the four fibre platforms 14 are permanently secured to the motherboard 41 with resin. In some circumstances the structure of the pump laser 31 is such that it should not be exposed to potential contamination from the resin that might give rise to facet damage. In these circumstances the structure of FIG. 4 may be modified so that the pump laser is provided with its own hermetic enclosure (not shown) within the housing 40. Such an enclosure will typically also include the ball lens 44a, optionally forming part of the wall of the enclosure. Another approach to this problem is to provide the pump laser 31 in the form of a separate fibre-pigtailed package (not shown) which is connected by its fibre pigtail to a fibre pigtail (not shown) threading a fifth feed-through (not shown) similar to feedthroughs 42a to 42d. Within the housing 40, the end of the fibre pigtail that threads the fifth feed-through is, like the fibre pigtails 43, secured to a fibre platform 14 (not shown) by which this fibre pigtail may be aligned with ball lens 44e.

Figure 6:
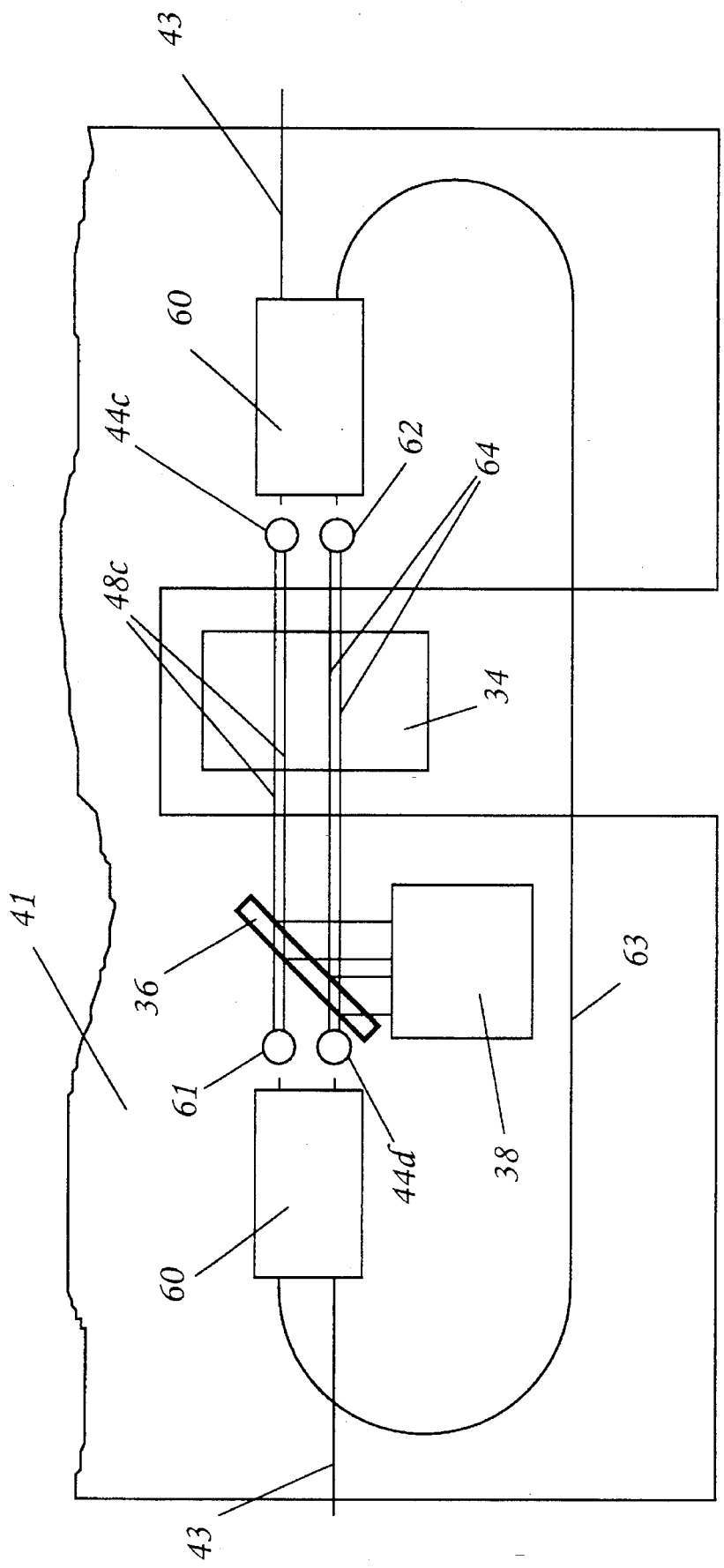
FIG. 6 is a plan view of a different portion of the substrate of FIG. 4 illustrating an alternative component layout.

The housing 40 and its motherboard 41 can very readily be redesigned for alternative topologies of an interconnection network of the components of an optical amplifier. By way of particular example, for certain applications a greater isolation efficiency may be desired than is readily achievable by a single passage of the light through a single isolator. Improved isolation can be achieved by arranging for the light to make a single passage through a pair of isolators optically in tandem. An alternative approach is to arrange for the light to make a double passage through a single isolator. This can be contrived by modifying the design of the two fibre platforms 14 respectively associated with ball lenses 44c and 44d, making corresponding modifications to the co-operating groove geometry in the motherboard 41, and including a further pair of ball lenses together with an additional length of fibre. In FIG. 6 the two modified fibre platforms are depicted at 60, the two additional ball lenses at 61 and 62, and the length of additional optical fibre at 63. Light from the amplifying fibre 30 is formed into expanded beam 48c to make a first passage through isolator 34, but this expanded beam is incident upon ball lens 61 instead of ball lens 44d. Ball lens 61 focuses the light on to one end of fibre 63. This light emerges from the other end of the fibre to be formed into an expanded beam 64 by ball lens 62. In the form of this expanded beam 64, the light makes a second passage through the isolator, laterally displaced a small distance from the first, and is then focused by ball lens 44d on to the inboard end of the fibre pigtail 43 that threads feed-through 42d. The modified fibre platforms 60 differ from the fibre platforms 14 in that, instead of having the end of a single fibre secured in a single groove 13, there is a pair of identical parallel grooves 13 (not shown) in each of which is secured the end of an optical fibre.

Figure 7:
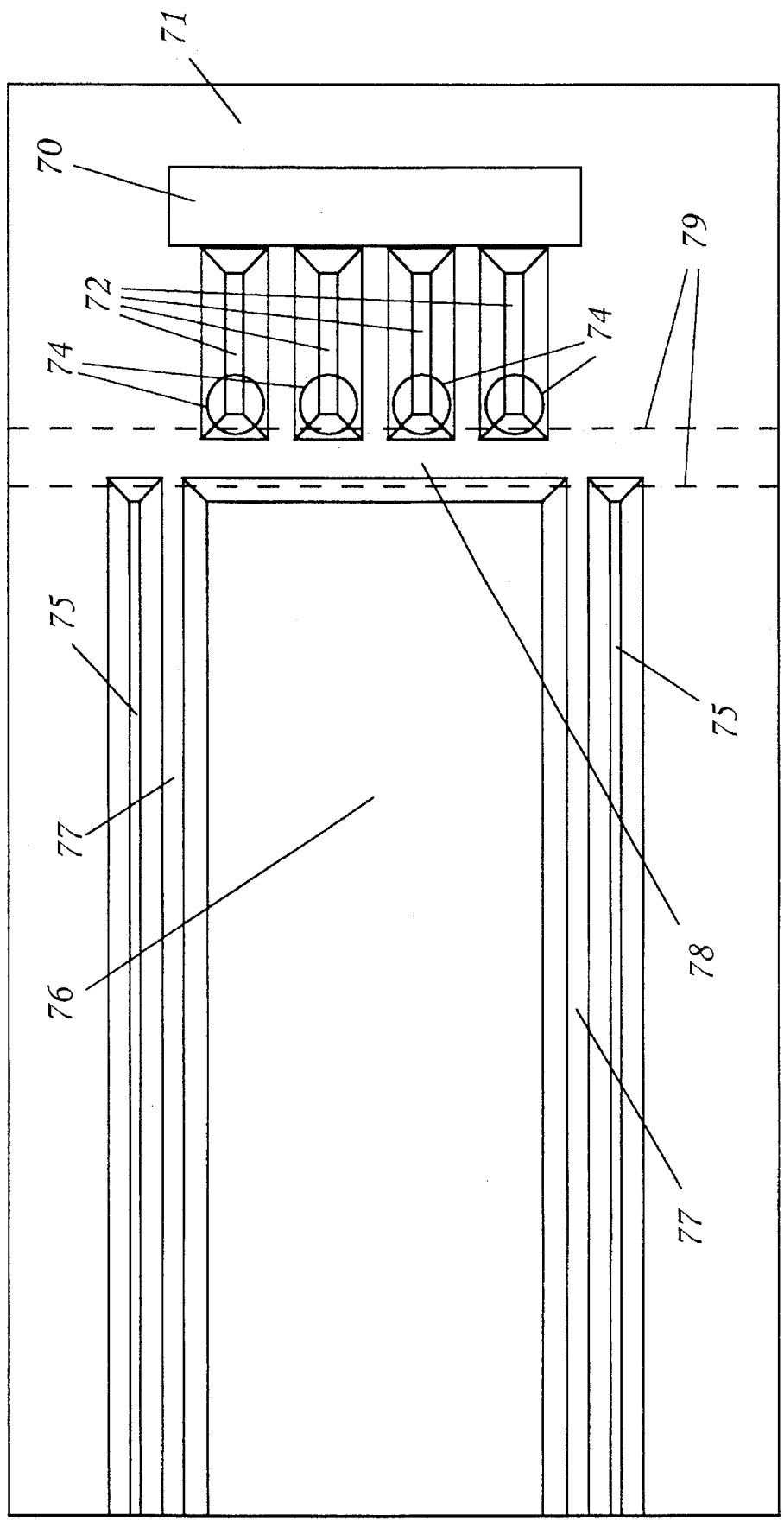
FIG. 7 depicts one of the parts of a two-part laser array to fibre ribbon coupling.

Fibre platforms with multiple fibre locating grooves 13 also find application in the provision of optical coupling between a fibre ribbon and an electro-optic transducer array such as a laser array. In figure 7 such a laser array is depicted at 70 mounted on a silicon motherboard 71. In front of the emitting facet of each laser of the array is a crystallographically etched well 72. For ease of illustration four wells have been depicted for use with a four-laser array. It should be clearly understood, however, that the alignment technique is also applicable to both smaller and larger numbered arrays. The motherboard 71 extends in a {100} plane, and each well 72 had four inwardly directed sloping facets extending in {111} planes. The upper end of one of these four facets is aligned with the front face of the laser array while the other three facets serve as locating surfaces for a ball lens 74. Each of the wells 72 thus having a function equivalent to that of groove 50 of FIG. 5. In front of the set of wells 72 is a crystallographically etched pair of grooves 75 between which is located a similarly crystallographically etched central groove 76 so that a pair of rails 77 is formed between the grooves 75 and the groove 76. These grooves 75, 76 and rails 77 perform the same function as the corresponding grooves 15, 16 and rails 17 in the motherboard 12 of FIG. 1. Central groove 76 is wider than the corresponding grove 16 because groove 76 has to accommodate the rails 19 of the co-operating fibre platform 14, but in this instance the rails 19 have, not just a single groove 13 between them, but a set of grooves equal in number to the number of the lasers in the array 70. A shallow saw-cut 79 performs a similar function as that of saw-cut 59 in FIG. 5, namely that of ensuring that light emerging from the ball lenses 74 shall not be unduly obstructed by the strip 78 of the motherboard that extends between the wells 72 and the groove 76.

If all the individual fibres of the fibre ribbon can be provided with substantially identical lensed ends extending in a straight line at right angles to the ribbon axis, then the use of the wells 72 and their associated ball lenses may be dispensed with, thereby providing a coupling arrangement more closely similar to that of the single laser to single fibre coupling of FIG. 1. The use of the ball lenses 72 enables the coupling to be made to a fibre ribbon the individual fibres of which terminate in planar faces, and their preparation in a manner to ensure that those faces extend in a straight line at right angles to the ribbon axis is much easier to accomplish. Moreover, because each ball lens forms a magnified image of its associated laser upon the end face of its associated fibre, the positional tolerance requirements between fibre and lens are relaxed.

We claim:

1. A method of mounting first and second optical components in optically coupled relationship, wherein the first optical component comprises an optical waveguide formed in or mounted on a first substrate and the second optical component is formed in or mounted on a second substrate, wherein the first and second substrates are provided with at least one pair of substantially complementary profile mating surfaces, and wherein the first and second optical components are positioned with respect to their respective substrates with a precision that ensures that a maximum value of optical coupling between said components occurs with a relative positioning of each of said mating surfaces with respect to its pair providing a non-zero spacing therebetween of not substantially more than 101μm, in which method said relative positioning is substantially established and is held while a bonding medium between each of said mating surfaces and its pair is solidified.

2. A method as claimed in claim 1, wherein the bonding medium is introduced in liquid form between each of said mating surfaces and its pair after said establishment of said relative positioning.

3. A method as claimed in claim 2, wherein the mating surfaces are configured to provide an interlocking arrangement having the property that direct contact between each of said mating surfaces and its pair serves to establish substantially optimised orientational relative alignment of said components, and wherein orientational relative alignment of said components is substantially optimised by brining each of said mating surfaces into direct contact with its pair prior to the employment of translational movements to establish said relative positioning.

4. A method as claimed in claim 3, wherein said relative positioning is established using a jig having first and second parts to which the first and second substrates are temporarily secured, wherein the temporary securing of one of the substrates to its associated part of the jig is by way of a soldered connection which is rendered fluid while said substantially optimised orientation relative alignment of said components is established, and which is then solidified while that orientational relative alignment is maintained.

5. A method as claimed in claim 1, wherein the bonding medium is applied to a member of the or each pair of mating surfaces prior to said establishment of said relative positioning.

6. A method as claimed in claim 5, wherein the mating surfaces are configured to provide an interlocking arrangement having the property that contact between each of one or more bonding medium coated mating surfaces and its pair serves to establish substantially optimised orientational relative alignment of said components, and wherein orientational relative alignment of said components is substantially optimised by bringing the or each said bonding medium coated mating surface into contact with its pair prior to the employment of translational movements to establish said relative positioning.

7. A method as claimed in claim 6, wherein said relative positioning is established using a jig having first and second parts to which the first and second substrates are temporarily secured, wherein the temporary securing of one of the substrates to its associated part of the jig is by way of a soldered connection which is rendered fluid while said substantially optimised orientation relative alignment of said components is established, and which is then solidified while that orientational relative alignment is maintained.

8. A method as claimed in claim 1, wherein said first optical component is one of a set of first optical components formed in or mounted on said first substrate, and said second optical component is one of a set of second optical components formed in or mounted on said second substrate.

9. A device having a first optical component comprising a first optical waveguide formed in or mounted on a first substrate and a second optical component comprising a second optical waveguide formed in or mounted on a second substrate, wherein the first and second substrates are provided with at least one pair of substantially complementary profile mating surfaces, wherein the first and second components are held positioned relative to each other so as to provide a substantially maximised value of optical coupling therebetween by a bonding medium that provides a bond between said at least one pair of substantially complementary profile mating surfaces, the bonding medium of said bond having a non-zero thickness of not substantially more than 10μm.

10. A device as claimed in claim 9, wherein the first optical component is an optical fibre.

11. A device as claimed in claim 10, wherein the second optical component is an injection laser.

12. A device as claimed in claim 9 wherein the first optical component is one of a set of first optical components which are optical fibres in the form of an optical fibre ribbon.

13. A device as claimed in claim 12 wherein the second optical component is one of a set of second optical components is one of a set of second optical components which are injection lasers in the form of an injection laser array.

14. An optical package having a housing containing a plurality of the component parts of an optical amplifier, the housing including a plurality of optical fibre ports optically coupled within the housing with optical fibre pigtails the inboard end of each of which is mounted in an associated one of a set of first substrates that are individually mounted on a common second substrate by the method claimed in claim 1.

* * * * *

UNITED STATES PATENT AND TRADEMARK OFFICE
CERTIFICATE OF CORRECTION

PATENT NO. : 5,574,811

DATED : November 12, 1996

INVENTOR(S) : Bricheno et al.

It is certified that error appears in the above-identified patent and that said Letters Patent is hereby corrected as shown below:

Column 1, line 47, " ± 31 μm " should be -- ± 3 μm --.
Column 1, line 57, " ± 0.41 μm " should be -- ± 0.4 μm --.
Column 5, line 52, " + 5 μm " should be -- ± 5μm --.
Column 11, line 41, " 101 μm " should be -- 10 μm --.

Signed and Sealed this

Ninth Day of March, 1999

Attest:

Q. TODD DICKINSON

*Attesting Officer*     *Acting Commissioner of Patents and Trademarks*